United States Patent
Haaland (10) Patent No.: US 11,846,257 B2
(45) Date of Patent: Dec. 19, 2023

(54) ENGINE SYSTEM WITH REVERSIBLE EXHAUST GAS RECIRCULATION PUMP FOR CONTROLLING BYPASS FLOW

(71) Applicant: Deere & Company, Moline, IL (US)

(72) Inventor: Eric J. Haaland, Waverly, IA (US)

(73) Assignee: DEERE & COMPANY, Moline, IL (US)

(*) Notice: Subject to any disclaimer, the term of this patent is extended or adjusted under 35 U.S.C. 154(b) by 30 days.

(21) Appl. No.: 17/306,604

(22) Filed: May 3, 2021

(65) Prior Publication Data
US 2022/0349365 A1 Nov. 3, 2022

(51) Int. Cl.
*F02M 26/34* (2016.01)
*F02M 26/33* (2016.01)
*F02M 26/04* (2016.01)
*F02M 26/25* (2016.01)
(Continued)

(52) U.S. Cl.
CPC .............. *F02M 26/33* (2016.02); *F01N 3/32* (2013.01); *F01N 11/002* (2013.01); *F02M 26/04* (2016.02); *F02M 26/25* (2016.02); *F01N 2550/14* (2013.01); *F01N 2590/08* (2013.01);
(Continued)

(58) Field of Classification Search
CPC ........ F02M 26/33; F02M 26/04; F02M 26/25; F01N 3/32; F01N 11/002
See application file for complete search history.

(56) References Cited

U.S. PATENT DOCUMENTS

| 6,062,026 A | 5/2000 | Woollenweber et al. |
| 6,138,649 A | 10/2000 | Khair et al. |
| 6,647,724 B1 | 11/2003 | Arnold et al. |

(Continued)

FOREIGN PATENT DOCUMENTS

| DE | 9421145 U1 | 5/1995 |
| DE | 102006015390 A1 | 10/2007 |

(Continued)

OTHER PUBLICATIONS

USPTO Non-Final Office Action issued in U.S. Utility U.S. Appl. No. 17/308,331 dated Jul. 21, 2022. (23 pages).

(Continued)

*Primary Examiner* — Gonzalo Laguarda
(74) *Attorney, Agent, or Firm* — KLINTWORTH & ROZENBLAT IP LLP (57) ABSTRACT

An engine system includes an engine having piston-cylinder arrangements communicating with an intake manifold and an exhaust manifold, a turbocharger including a turbine in communication with the exhaust manifold and a compressor driven by the turbine and in communication with the intake manifold, and an EGR system including an EGR pump having an inlet side in communication with the exhaust manifold and an outlet side in communication with the intake manifold, and an EGR cooler that cools exhaust gas flowing through the EGR system. The engine system also includes a controller operably connected with the EGR pump and configured to selectively operate the EGR pump in a forward mode to flow exhaust gas therethrough in a first direction and in a reverse mode to substantially prevent flow of exhaust gas therethrough or provide a non-exhaust air flow therethrough in a second direction.

16 Claims, 3 Drawing Sheets

(51) Int. Cl.
*F01N 3/32* (2006.01)
*F01N 11/00* (2006.01)

(52) U.S. Cl.
CPC .. *F01N 2900/08* (2013.01); *F01N 2900/1404* (2013.01); *F01N 2900/1406* (2013.01)

(56) References Cited

U.S. PATENT DOCUMENTS

| | | | |
|---|---|---|---|
| 8,176,736 | B2 | 5/2012 | Janssen |
| 8,181,452 | B2 | 5/2012 | Bidner et al. |
| 8,522,756 | B2 | 9/2013 | Vuk et al. |
| 8,820,056 | B2 | 9/2014 | VanDyne et al. |
| 9,347,365 | B2 | 5/2016 | Hunter |
| 9,540,989 | B2 | 1/2017 | Sanchez Perez et al. |
| 9,869,258 | B2 | 1/2018 | Dion |
| 10,145,320 | B1 | 12/2018 | Zeng et al. |
| 10,641,191 | B2 | 5/2020 | Zeng et al. |
| 11,205,789 | B2 * | 12/2021 | Tanimoto .......... H01M 8/04753 |
| 2008/0092861 | A1 | 4/2008 | Duffy et al. |
| 2009/0107142 | A1 | 4/2009 | Russell et al. |
| 2010/0018203 | A1 | 1/2010 | Richards |
| 2010/0146968 | A1 | 6/2010 | Simpson et al. |
| 2011/0016862 | A1 | 1/2011 | Song et al. |
| 2011/0209473 | A1 | 9/2011 | Fritz et al. |
| 2013/0098030 | A1 | 4/2013 | Freund et al. |
| 2013/0297126 | A1 | 11/2013 | Yamazaki et al. |
| 2014/0109571 | A1 | 4/2014 | Primus et al. |
| 2016/0010576 | A1 | 1/2016 | Primus et al. |
| 2016/0265468 | A1 | 9/2016 | Takayanagi et al. |
| 2019/0107066 | A1 | 4/2019 | Kurtz et al. |
| 2019/0383244 | A1 | 12/2019 | Kim |
| 2020/0011229 | A1 | 1/2020 | Waldron et al. |
| 2020/0173354 | A1 | 6/2020 | Punjani et al. |
| 2020/0309059 | A1 | 10/2020 | Hotta et al. |
| 2021/0277849 | A1 | 9/2021 | Rahm et al. |
| 2022/0090566 | A1 * | 3/2022 | Magnusson .......... F02M 26/15 |
| 2022/0106919 | A1 | 4/2022 | Carlén Andersson et al. |
| 2022/0381204 | A1 | 12/2022 | Peters et al. |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 804124 | 11/1958 |
| JP | 09268916 A1 | 10/1997 |
| JP | 2001073880 A1 | 3/2001 |
| JP | 2006057570 A | 3/2006 |
| JP | 4788531 B2 | 10/2011 |
| KR | 101999909 B1 | 7/2019 |
| RU | 2719758 C2 | 4/2020 |
| WO | 2013068800 A1 | 5/2013 |
| WO | 2013186373 A1 | 12/2013 |
| WO | 2019219701 A1 | 11/2019 |
| WO | 2020064679 A1 | 4/2020 |
| WO | WO-2021015613 A1 * | 1/2021 ............. F01N 3/021 |

OTHER PUBLICATIONS

USPTO Final Office Action issued in U.S. Utility U.S. Appl. No. 17/358,587 dated Jul. 25, 2022. (17 pages).
USPTO Non-Final Office Action issued in U.S. Utility U.S. Appl. No. 17/237,876 dated Aug. 16, 2022. (18 pages).
USPTO Non-Final Office Action issued in US Utility U.S. Appl. No. 17/237,876 dated Aug. 31, 2021.
Garrett Advancing Motion, 48V Electric Compressor for Mild Hybrid Vehicles, @ 2021 Garrett Motion Inc. (9 pages).
Eaton, Diesel Engine EGR Pump, Precision Air Flow, https://www.eaton.com/us/en-us/products/engine-solutions/superchargers/TVS-technology-applications/tvs-diesel-egr-pump.html, @ 2021 Eaton. (5 pages).
Garrett Advancing Motion, E-Turbo Technology Accelerating Global Powertrain Electrification Trends Beginning with Mercedes-AMG, Media Pressroom—Press Releases, Jul. 22, 2020, @ 2021 Garrett Motion Inc. (4 pages).
University Wisconsin, Electric Turbo Chargers, Overview of Forced Induction System, WEMPEC Electrification of FIS, EFIS Topologies, @ Board of Regents of the University of Wisconsin System, Mar. 2016. (1 page).
U.S. Utility U.S. Appl. No. 17/237,876, filed Apr. 22, 2021.
USPTO Non-Final Office Action issued in U.S. Utility U.S. Appl. No. 17/237,876 dated Jan. 21, 2022.
USPTO Final Office Action issued in U.S. Utility U.S. Appl. No. 17/237,876 dated Mar. 8, 2022.
USPTO Non-Final Office Action issued in U.S. Utility U.S. Appl. No. 17/406,656 dated Sep. 15, 2022. (16 pages).
Final Office Action issued in U.S. Utility U.S. Appl. No. 17/406,656 dated Mar. 9, 2023.
Non-Final Office Action issued in U.S. Utility U.S. Appl. No. 17/406,656 dated Aug. 9, 2023.

* cited by examiner

ENGINE SYSTEM WITH REVERSIBLE EXHAUST GAS RECIRCULATION PUMP FOR CONTROLLING BYPASS FLOW

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to internal combustion engines and, more particularly, to such engines systems having an exhaust gas recirculation system with a reversible pump for controlling a bypass flow of exhaust gas therethrough.

BACKGROUND OF THE DISCLOSURE

It is common for internal combustion engine systems on many work vehicles to include one or more turbochargers that boost airflow to the engine to improve engine performance. Each turbocharger includes a turbine and a compressor, with the turbine driven by exhaust gas from the engine and the compressor, in turn, being driven by the turbine to compress air provided to the combustion chambers. To control NOx emissions, it is common to recirculate a portion of exhaust gas (EGR) and mix that exhaust gas with intake air for combustion to reduce combustion temperatures, thereby inhibiting NOx formation. The amount of exhaust gas recirculated in the engine system may be controlled by an EGR valve or EGR pump. An EGR valve may control the flow of exhaust gas for mixing with the intake air based on a pressure differential between the exhaust gas and the intake air, while an EGR pump may be selectively operated to control the flow of exhaust gas for mixing with the intake air.

SUMMARY OF THE DISCLOSURE

An engine system includes an engine having one or more piston-cylinder arrangements communicating with an intake manifold and an exhaust manifold, a turbocharger including a turbine in communication with the exhaust manifold and a compressor driven by the turbine and in communication with the intake manifold, and an exhaust gas recirculation (EGR) system, with the EGR system further including an EGR pump having an inlet side in communication with the exhaust manifold and an outlet side in communication with the intake manifold and an EGR cooler that cools exhaust gas flowing through the EGR system. The engine system also includes a controller having a processor and memory architecture, with the controller operably connected with the EGR pump and configured to selectively operate the EGR pump in a forward mode to provide a flow of exhaust gas therethrough in a first direction and in a reverse mode to substantially prevent a flow of exhaust gas therethrough or to provide a non-exhaust air flow therethrough in a second direction.

In another implementation, an engine system includes an engine having one or more piston-cylinder arrangements communicating with an intake manifold and an exhaust manifold, a turbocharger including a turbine in communication with the exhaust manifold and a compressor driven by the turbine and in communication with the intake manifold, and an exhaust gas recirculation (EGR) system, with the EGR system further including an EGR pump downstream of the exhaust manifold and upstream or downstream of the turbine, the EGR pump having an inlet side in communication with the exhaust manifold and an outlet side in communication with the intake manifold, and an EGR cooler that cools exhaust gas flowing through the EGR system. The engine system also includes a controller having a processor and memory architecture, with the controller operably connected with the EGR pump and configured to receive input signals on an operating condition of the engine system and selectively operate the EGR system based on the input signals, to control a recirculation of exhaust gas from the exhaust manifold to the intake manifold, wherein selectively operating the EGR system includes operating the EGR pump in a forward mode to flow exhaust gas therethrough in a first direction and in a reverse mode to substantially prevent flow of exhaust gas therethrough or to provide a non-exhaust air flow therethrough in a second direction.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, internal combustion engines may include one or more turbochargers that compress air that is supplied to combustion chambers within the engine. In operation of the turbocharger(s), exhaust gas produced by the engine is used to drive a turbine of the turbocharger, with exhaust gas flowing through the turbine and causing it to rotate, thereby driving a compressor of the turbocharger such that the compressor forces air into the combustion chambers of the engine. Additionally, at least a portion of the exhaust gas may be recirculated back to the intake of the engine for mixing with intake air to control NOx emissions, with the amount of exhaust gas that is recirculated being controlled by an EGR valve or EGR pump.

In an EGR system that utilizes an EGR pump for controlling the recirculation of exhaust gas back to the engine intake, the pump may be a mechanically or electrically driven pump that draws exhaust gas therein and controllably outputs a desired amount of exhaust gas. In operating the EGR pump, it is recognized that recirculation of exhaust gas may not be desired during all times or modes of operation of the engine system.

As one example of where recirculation of exhaust gas may not be desired, it is common to periodically operate an engine system in an exhaust thermal management (ETM) mode where regeneration or cleaning of an aftertreatment system is performed. During an ETM mode of operation, the levels of hydrocarbon and heat energy provided to the aftertreatment system are increased to promote diesel particulate filtration (DPF) burn-off or selective catalyst reduction (SCR) regeneration, for example. With the increased levels of hydrocarbon present in the engine system during the ETM mode, it is desirable to turn off the EGR system flow to prevent fouling of the EGR system components, such as soot or hydrocarbon build-up in the EGR pump and/or in an EGR cooler of the EGR system.

As another example of where recirculation of exhaust gas may not be desired, during start-up of the internal combustion engine or during operation thereof at a low load or low speed, the amount of exhaust gas generated by the engine is such that recirculation thereof is undesirable or impractical. That is, during such operating conditions, the amount of exhaust gas generated by the engine is reduced to a level (as compared to operation of the engine at a normal, steady-state speed and load) that recirculation thereof by the EGR system is not possible or would negatively impact performance of the turbocharger by removing exhaust gas that drives the turbine thereof. It may therefore be desired to turn off the EGR flow during engine start-up or during operation of the engine at a low load or low speed.

Because of the structure of a typical EGR pump, exhaust gas will leak therethrough during periods where the EGR pump is not being operated. That is, the EGR pump may be a clearance device such as a roots style blower, for example, and thus there are gaps present between the rotors of the pump and the housing thereof through which exhaust gas can flow. Leakage of exhaust gas through the EGR pump, or "EGR bypass flow," may be significant when the pressure difference on opposing sides of the pump is great, such as may occur during an ETM mode of operation when pressure levels on the exhaust side of the engine (and the EGR pump) are increased. The leakage of exhaust gas through the EGR pump can lead to elevated levels of soot or hydrocarbons coating EGR component surfaces that can, in turn, lead to plugging and fouling of the EGR cooler and/or EGR pump, as well as over-cooling of EGR gases leading to the formation of condensate that can lead to corrosion of these devices.

To address the issue of leakage of exhaust gas through the EGR pump, an engine system is provided with an EGR pump that is operable in forward and reverse modes of operation. During operating modes or conditions of the engine where recirculation of exhaust gas is desired, the EGR pump may be operated in the forward mode to recirculate exhaust gas back to the intake of the engine for mixing with intake air for combustion. During operating modes or conditions of the engine where recirculation of exhaust gas is not desired, such as in the ETM mode or during low speed or low load conditions, the EGR pump may be operated in the reverse mode to prevent leakage of exhaust gas therethrough. During the reverse mode of operation, the EGR pump may be spun at a speed that substantially prevents flow of exhaust gas therethrough (i.e., a zero flow) or at a speed that provides a non-exhaust air flow therethrough in an opposite direction from that of the exhaust gas flow. Operation of the EGR pump in the reverse mode can therefore inhibit leakage of exhaust gas through the EGR pump, thereby reducing contamination and potential corrosion of the EGR cooler and EGR pump and increasing the longevity thereof.

In one implementation, a controller in the engine system selectively operates the EGR pump based on a determine operating mode or condition of the engine system. The controller may monitor a condition of an aftertreatment system in the engine system and operate the engine system in the ETM mode if it is determined that the aftertreatment system needs to be cleaned. Upon switching the engine system to the ETM mode, the controller then operates the EGR pump in the reverse mode to prevent leakage of exhaust gas therethrough. The EGR pump may also monitor one or more operational parameters in the engine system during operation and operate the engine system in either a "low speed-low load" mode or an EGR mode based on the one or more operational parameters. When the engine system is operating in a low speed-low load mode, the controller operates the EGR pump in the reverse mode to prevent leakage of exhaust gas therethrough.

In another implementation, the EGR system may include various flow passageways and a directional valve that direct air and exhaust gas flow based on the operational mode of the EGR pump. The directional valve is actuatable to one of two positions to direct air and exhaust gas flows along one on the flow passageways. When the EGR pump is in the forward mode of operation, the valve can be actuated to a first position to direct a flow of exhaust gas along a passageway having the EGR cooler thereon, to cool the exhaust gas prior to it being recirculated back to the engine intake. When the EGR pump is in the reverse air mode of operation, the valve can be actuated to a second position to direct a flow of non-exhaust air along a bypass loop that bypasses the EGR cooler.

Example embodiments of an engine system having an EGR pump operable as described above will now be described in conjunction with FIGS. 1-3 according to this disclosure. The following examples notwithstanding, engine systems having internal combustion engines and turbocharger assemblies of other constructions would also benefit from an EGR pump and intercooler being incorporated therein according to aspects of the invention. It is therefore recognized that aspects of the invention are not meant to be limited only to the specific embodiments described hereafter.

Example Embodiment(s) of an Engine System with Exhaust Gas Recirculation Pump for Controlling Bypass Flow According to embodiments, an engine system is disclosed that includes an EGR pump for controlling bypass flow through the EGR pump. As will become apparent to those skilled in the art from the following description, the engine system finds particular applicability in compression ignition gasoline or diesel engines that are used in a work vehicle, and therefore the illustrative examples discussed herein utilize such an environment to aid in the understanding of the invention.

Figure 1:
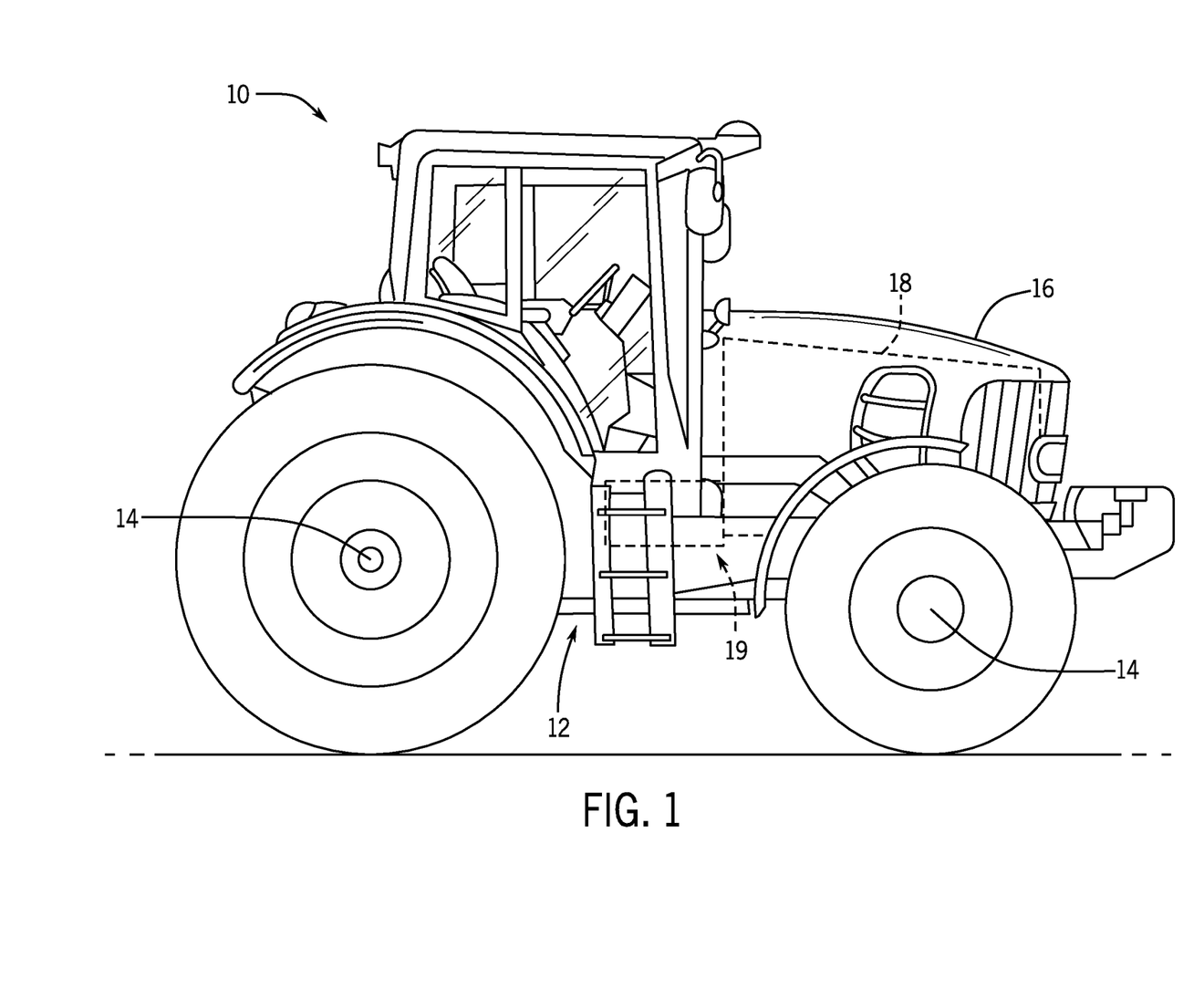
FIG. 1 is a simplified side view of an example work vehicle in which embodiments of the present disclosure may be implemented.

Referring initially to FIG. 1, a work vehicle 10 is shown that can implement embodiments of the invention. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle types. The work vehicle 10 includes a chassis or frame 12 carried on front and rear wheels 14. Positioned on a forward end region of the chassis 12 is a casing 16 within which is located an engine system 18. The engine system 18 provides power via an associated powertrain 19 to an output member (e.g., an output shaft, not shown) that, in turn, transmits power to axle(s) of the work vehicle 10 to provide propulsion thereto and/or to a power take-off shaft for powering an implement on or associated with the work vehicle 10, for example.

Figure 2:
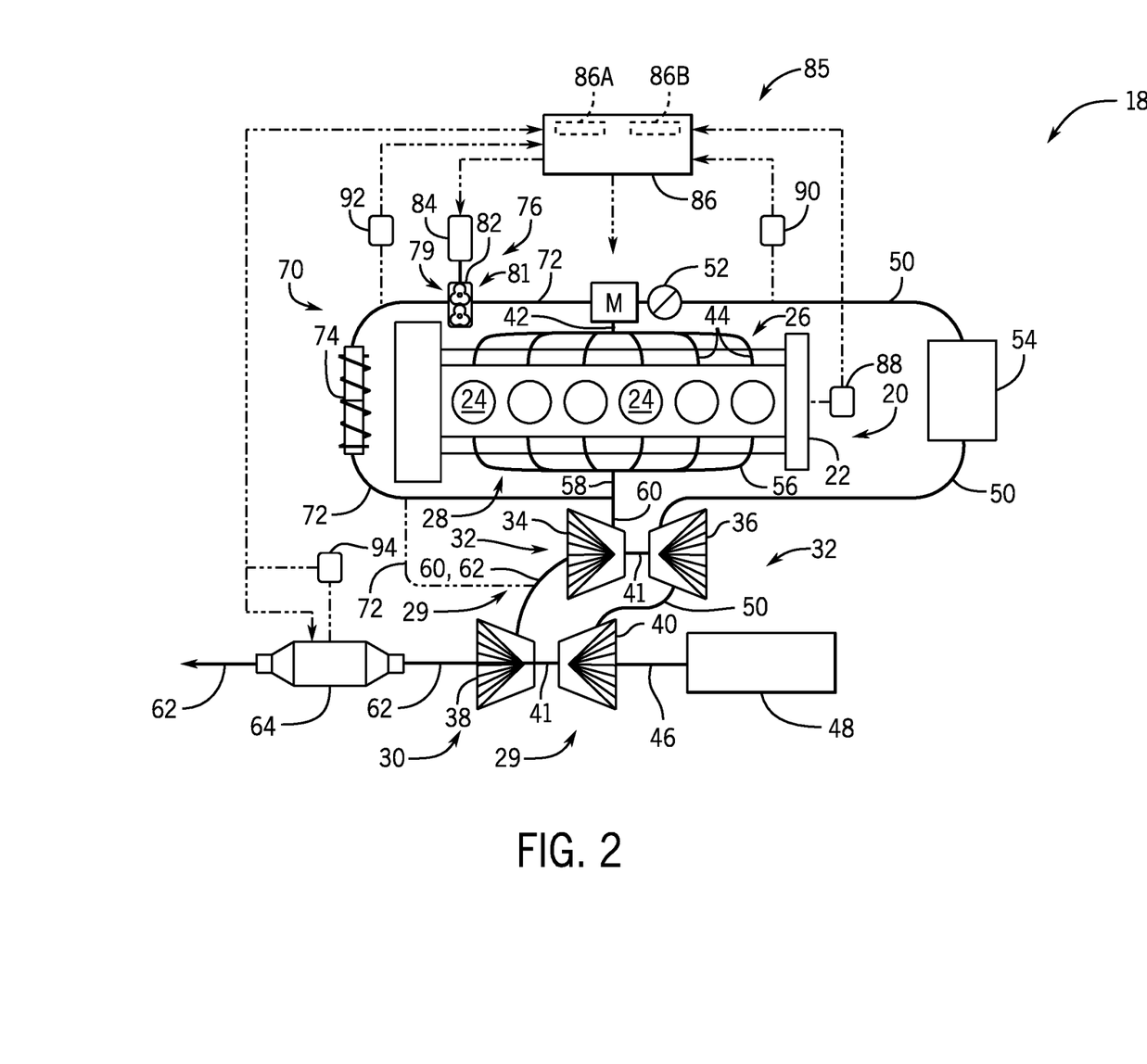
FIG. 2 is a schematic diagram of an example engine system having a reversible EGR pump in accordance with an example embodiment.

The engine system 18 is illustrated in greater detail in FIG. 2 in accordance with an example implementation. The engine system 18 includes an internal combustion engine 20 (hereafter, "engine") that, in different embodiments, may be a stoichiometric or lean burn piston engine. The engine 20 of the engine system 18 includes an engine block 22 having a plurality of piston-cylinder arrangements 24 that operate to cause combustion events. In the illustrated implementation, the engine 20 is an inline-6 (I-6) engine defining six piston-cylinder arrangements 24; however, in alternative implementations various engine styles and layouts may be used.

The engine system 18 also includes an intake manifold 26 fluidly connected to the engine 20, an exhaust manifold 28 fluidly connected to the engine 20, and a turbocharger assembly 29. In the illustrated embodiment, the turbocharger assembly 29 includes a pair of series-connected turbochargers 30, 32 fluidly connected to and in operable communication with the intake manifold 26 and the exhaust manifold 28, although it is recognized that in other embodiments the engine system 18 could instead include only a single turbocharger. As shown in FIG. 2, the turbocharger assembly 29 includes a low-pressure (LP) turbocharger 30 and a high-pressure (HP) turbocharger 32 arranged in series—with each of the turbochargers 30, 32 including a turbine 34, 38 and a compressor 36, 40 mechanically connected via a rotatable shaft 41. In operation of each of the turbochargers 30, 32, exhaust gas flowing through the turbine 34, 38 causes the turbine to rotate, thereby causing the shaft 41 to rotate. Rotation of the shaft 41, in turn, causes the compressor 36, 40, to also rotate, which draws additional air into the compressors 36, 40 to thereby increase the flow rate of air to the intake manifold 26 above what it would otherwise be without the turbochargers 30, 32, and in this manner the turbochargers 30, 32 supply so-called "charge" air to the engine 20.

As indicated, the HP and LP turbochargers 32, 30 are arranged in series with one another. The HP turbocharger 32 features a turbine 34 (HP turbine) for receiving exhaust gas from the exhaust manifold 28, and a compressor 36 (HP compressor) coupled to the HP turbine 34 for delivering pressurized air to the intake manifold 26 for combustion. The LP turbocharger 30 features a turbine 38 (LP turbine) for receiving exhaust gas from the HP turbine 34, and a compressor 40 (LP compressor) coupled to the LP turbine 38 for delivering pressurized air to the HP compressor 36 for further pressurization. Both the LP and HP turbochargers 30, 32 function to recover a portion of heat energy from the exhaust gas with their respective turbines 34, 38, to drive their respective compressors 36, 40 and thereby increase the amount of charge air delivered to the engine 20 for combustion.

As shown in FIG. 2, the intake manifold 26 includes a main intake 42 and a plurality of secondary pipes 44, with each of the secondary pipes 44 in fluid communication with a corresponding piston-cylinder arrangement 24 to direct a supply of air thereto. Fresh air is provided to the intake manifold 26 from the ambient environment via a fresh air intake passageway 46. Fresh air is drawn into the fresh air intake passageway 46, passed through an air filter 48 disposed in-line with the fresh air intake passageway 46, and provided to the LP compressor 40. The LP compressor 40 performs a first compression to the fresh air and provides it to the HP compressor 36 via a charge air passageway 50. The charge air passageway 50 then runs from the HP compressor 36 to the intake manifold 26 to provide compressed charge air from the HP compressor 36, with an air throttle 52 and charge air cooler 54 (i.e., "aftercooler 54") positioned in the charge air passageway 50. The air throttle 52 regulates the amount of compressed charge air provided to the intake manifold 26, while the aftercooler 54 reduces the temperature of the charge air prior to it being provided to the engine 20, so as to increase the unit mass per unit volume (i.e., density) of the charge air for improved volumetric efficiency.

The exhaust manifold 28 of the engine system 18 includes a plurality of secondary pipes 56, each in fluid communication with a corresponding piston-cylinder arrangement 24, that direct exhaust gases generated by the engine 20 to a main outlet 58. The exhaust manifold 28 is fluidly coupled to inlets of the turbines 34, 38 of the turbochargers 30, 32 via an exhaust gas passageway 60, with fluid outlets of the turbines 34, 38 then fluidly coupled to the ambient environment via a vent passageway 62. Exhaust gas produced by the engine 20 is directed out from the exhaust manifold 28 and passes through the exhaust gas passageway 60 to the turbines 34, 38, with the exhaust gas then exiting the turbines 34, 38 to the ambient environment via the vent passageway 62 in a conventional manner.

An aftertreatment system 64 is disposed in-line with the vent passageway 62 to treat the exhaust gas prior to the exhaust gas being vented to the ambient environment. The aftertreatment system 64 may include one or more components or devices that treat the exhaust gas, such as a diesel oxidation catalyst, diesel particulate filtration (DPF) device, or selective catalyst reduction (SCR) device, for example. As will be explained in greater detail below, the aftertreatment system 64 may be regenerated during an exhaust thermal management (ETM) mode of operation of the engine system 18, with levels of hydrocarbon and heat energy provided to the aftertreatment system 64 being increased during the ETM mode. The increased hydrocarbon and heat energy provided to the aftertreatment system 64 may promote burn-off of soot that accumulates on the DPF device and/or the removal of sulfur that accumulates in the SCR device (i.e., desulfurization), for example.

An exhaust gas recirculation (EGR) system 70 is further provided in the engine system 18 that functions to recirculate a portion of the exhaust gas generated by the engine 20 and thereby reduce the formation of NOx during combustion. Exhaust gas is drawn from the exhaust manifold 28 and recirculated into the intake manifold 26 via the EGR system 70. The EGR system 70 includes an EGR passageway 72, an EGR cooler 74, and an EGR pump 76. The EGR passageway 72 draws in a portion of the exhaust gas that is flowing within the exhaust gas passageway 60 for circulation through the EGR system 70. In the illustrated embodiment, the EGR passageway 72 draws in exhaust gas from the exhaust gas passageway 60 at a location upstream from the HP turbine 34 (such that the EGR pump 76 is considered as being positioned upstream from the HP turbine 34). In an alternative embodiment, and as shown in phantom in FIG. 2, the EGR passageway 72 draws in exhaust gas from the exhaust gas passageway 60 at a location downstream from the HP turbine 34 (such that the EGR pump 76 is considered as being positioned downstream from the HP turbine 34). The EGR cooler 74 is disposed in-line with the EGR passageway 72 for the purpose of cooling the exhaust gas flowing through the EGR passageway 72 and may be upstream of the EGR pump 76 (as shown in FIG. 2) or downstream of the EGR pump 76. The EGR pump 76 has an inlet side 79 in fluid communication with the exhaust manifold 28 and an outlet side 81 in fluid communication with the intake manifold 26. In one embodiment, the EGR pump 76 is constructed as a roots style pump having rotors 82 driven by an electric motor 84 that is operable in a manner as described in detail below, although it is recognized that the EGR pump 76 may alternately be configured as a pump of a different style or construction, such as a screw or scroll or vane compressor, for example. The EGR pump 76 may be electrically controlled to selectively control the flow of exhaust gas recirculated from the exhaust gas passageway 60 to the engine 20 via the EGR passageway 72.

The EGR pump 76 is configured as a reversible pump that is operable in two different modes—a forward mode and a reverse mode—with the EGR pump 76 being electrically controlled to selectively control the mode of operation thereof. In the forward mode, the EGR pump 76 operates to recirculate a portion of the exhaust gas from the exhaust gas passageway 60 into the intake manifold 26. In the reverse mode, the EGR pump 76 operates in reverse from the forward mode to prevent leakage of exhaust gas therethrough, as may occur if the EGR pump 76 were simply turned off when not operating in the forward mode. When operating in the reverse mode, the speed of the EGR pump 76 may be controlled to determine a flow output therefrom, with the EGR pump operable at a speed that substantially prevents flow of exhaust gas therethrough (i.e., a zero flow) or at a speed that provides a non-exhaust air (i.e., fresh air) flow therethrough in an opposite direction from that of the exhaust gas flow. When operated to provide a non-exhaust air flow therethrough in the reverse direction, the EGR pump 76 provides a flow of fresh air that is mixed with exhaust gas output from the exhaust manifold 28, with this mixture then provided to the turbines 34, 38 to drive operation of the turbochargers 30, 32.

As illustrated in FIG. 1, the engine system 18 includes a control system 85, which includes a controller 86. The controller 86 includes a processor 86a and memory 86b. The processor 86a performs the computation and control functions of the controller 86 and may comprise any type of processor or multiple processors, single integrated circuits such as a microprocessor, or any suitable number of integrated circuit devices and/or circuit boards working in cooperation to accomplish the functions of a processing unit. During operation, the processor 86a executes one or more programs which may be contained within the memory 86b and, as such, controls the general operation of the controller 86 and the computer system of the controller 86 in executing the functions described herein. In the depicted embodiment, the memory 86b stores the above-referenced program(s).

The computer system of the controller 86 may also otherwise differ from the embodiment depicted in FIG. 2, for example the computer system of the controller 86 may be coupled to or may otherwise utilize one or more remote computer systems and/or other control systems.

Generally, the controller 86, is used to provide at least some of the engine system operations and functions described herein. In general, the controller 86 is electrically coupled with: the engine 20; the EGR pump 76; an engine speed sensor 88; sensor(s) 90 that may include any or all of mass airflow, temperature, and pressure sensors in the intake manifold 26 or charge air passageway 50; sensor(s) 92 in the exhaust manifold 28 or EGR system 70 that may include any or all of oxygen, temperature, and pressure sensors; and one or more aftertreatment system sensors 94 that determine a condition of the aftertreatment system 64, i.e., the condition of component(s) in the aftertreatment system 64, such as the amount of soot trapped in a DPF device (grams or percentage of the device plugged) and/or the amount of sulfur accumulated in an SCR device, for example. While sensors 88, 90, 92, 94 are shown in FIG. 2 as separate, dedicated sensors, it is recognized that sensing capabilities for measuring some parameters may be built-in to components of the engine system 18, such as in the EGR pump 76 and/or the turbochargers 30, 32 for example, and that certain parameters may be calculated rather than measured, such as mass airflow from calibrations and temperature and pressure maps, for example. The controller 86 may also be coupled with other devices necessary to provide the desired system control functions including various other actuators and sensors, such as NOx sensors and fuel sensors (not shown). The controller 86 receives inputs from the various sensors 88, 90, 92, 94 that generate signals in proportion to various physical parameters associated with the engine 20, the engine system 18 and any other sources. In some embodiments, the controller 86 may be configured to provide other functionality of the vehicle 10 in addition to the control functions disclosed herein.

Responsive to inputs received thereby, the controller 86 operates to identify a current operational mode of the engine system 18 and output control signals to one or more components in the engine system 18 to control operation thereof and thereby control and modify the operational mode of the engine system 18, including operation of the EGR pump 76. Controls and modifications to operation of the engine system 18 implemented by the controller 86 are performed during ongoing operation of the engine system, with the controller 86 switching modes of operation of the engine system, as well as associated operation of the EGR pump 76, as necessary based on monitored parameters of the engine system.

In one implementation, the controller 86 receives inputs on the engine speed (or engine load—as determined by air flow and fuel requested/required) and the mass airflow, temperature, and/or pressure of the intake air (in the intake manifold 26 or charge air passageway 50) and the exhaust gas (in the exhaust manifold 28 or EGR system 70) to determine whether exhaust gas is to be recirculated during engine operation. When it is determined by the controller 86 that recirculation of exhaust gas is desired (based on the above referenced parameters), the controller 86 identifies the engine system 18 as operating in an EGR mode and operates the EGR pump 76 in a forward mode to provide for the recirculation of exhaust gas from the exhaust manifold 28 to the intake manifold 26, with recirculated exhaust gas being mixed with charge air and provided to the intake manifold 26. Alternatively, when it is determined by the controller 86 that recirculation of exhaust gas is not desired (based on the above referenced parameters), the controller 86 identifies the engine system 18 as operating in a low speed-low load mode and operates the EGR pump 76 in a reverse mode such that no recirculation of exhaust gas occurs. Identification by the controller of the engine system 18 operating in the EGR mode or low speed-low load mode as indicated above may be according to an algorithm or program stored on the memory 86b of the controller 86, with the measured engine speed (or engine load) and mass airflow, temperature, and/or pressure of the intake air and the exhaust gas being compared to pre-determined threshold levels to identify the engine system operating mode.

In another implementation of the operation of the controller 86, the controller 86 functions to operate the engine system 18 in the ETM mode to promote regeneration of the aftertreatment system 64, with the controller 86 also operating the EGR pump 76 in accordance with entering into the ETM mode. In one embodiment, the controller 86 receives inputs on the condition of the aftertreatment system 64 to selectively operate the engine system 18 in the ETM mode. The controller 86 may receive signals from the aftertreatment condition sensor 94 on a condition of the aftertreatment system 64, such as the amount of soot trapped in a DPF device and/or the amount of sulfur accumulated in an SCR device, for example, and then compare the condition of device(s) in the aftertreatment system 64 to a condition threshold, which such a comparison performed according to an algorithm or program stored on the memory 86b of the controller 86, for example. When the condition of device(s) in the aftertreatment system 64 deteriorate beyond the condition threshold, the controller 86 then causes the engine system 18 to operate in the ETM mode to regenerate the aftertreatment system 64, such as by injecting extra fuel into the exhaust stream (via an extra injector) and raising the temperature of device(s) in the aftertreatment system 64, thereby increasing hydrocarbon and temperature levels present in the aftertreatment system 64 during ETM mode. When the controller 86 causes the engine system 18 to operate in the ETM mode, the controller 86 operates the EGR pump 76 in the reverse mode such that no recirculation of exhaust gas occurs. By operating the EGR pump 76 in the reverse mode, exhaust gas is prevented from leaking through the EGR pump 76, thereby preventing fouling of the EGR cooler 74 and EGR pump 76 that might occur during operation of the engine system 18 in the ETM mode due to the increased level of hydrocarbon present in the exhaust gas.

While operating the engine system 18 in the ETM mode is described above as a process implemented automatically by the controller 86, it is recognized that transitioning to the ETM mode may also be an operator-initiated process. That is, an operator may provide an input to the controller 86 commanding a transition over to the ETM mode, with the controller 86 causing the engine system 18 to operate in the ETM mode (increasing the hydrocarbon and temperature levels present in the aftertreatment system 64) responsive to the operator command.

In one embodiment, when the EGR pump 76 is being operated in the reverse mode (during operation of the engine system 18 in the low speed-low load mode or the ETM mode), the controller 86 further controls the speed at which the EGR pump 76 (i.e., of the rotors 82 therein) is operated to counteract pressure forces and control a flow of air therethrough in the opposite direction from the normal exhaust gas flow. In a lower speed of operation in the reverse mode, the EGR pump 76 may provide what is termed as a "zero" flow therethrough, where a flow of exhaust gas through the EGR pump 76 is substantially prevented but where no flow of non-exhaust air flow (i.e., fresh air flow) is generated in the opposite direction. In a higher speed of operation in the reverse mode, the EGR pump 76 may provide a flow of non-exhaust or fresh air therethrough in the opposite direction of normal exhaust gas flow, with this fresh air being routed back through the EGR passageway 72 and into the exhaust gas passageway 60.

Figure 3:
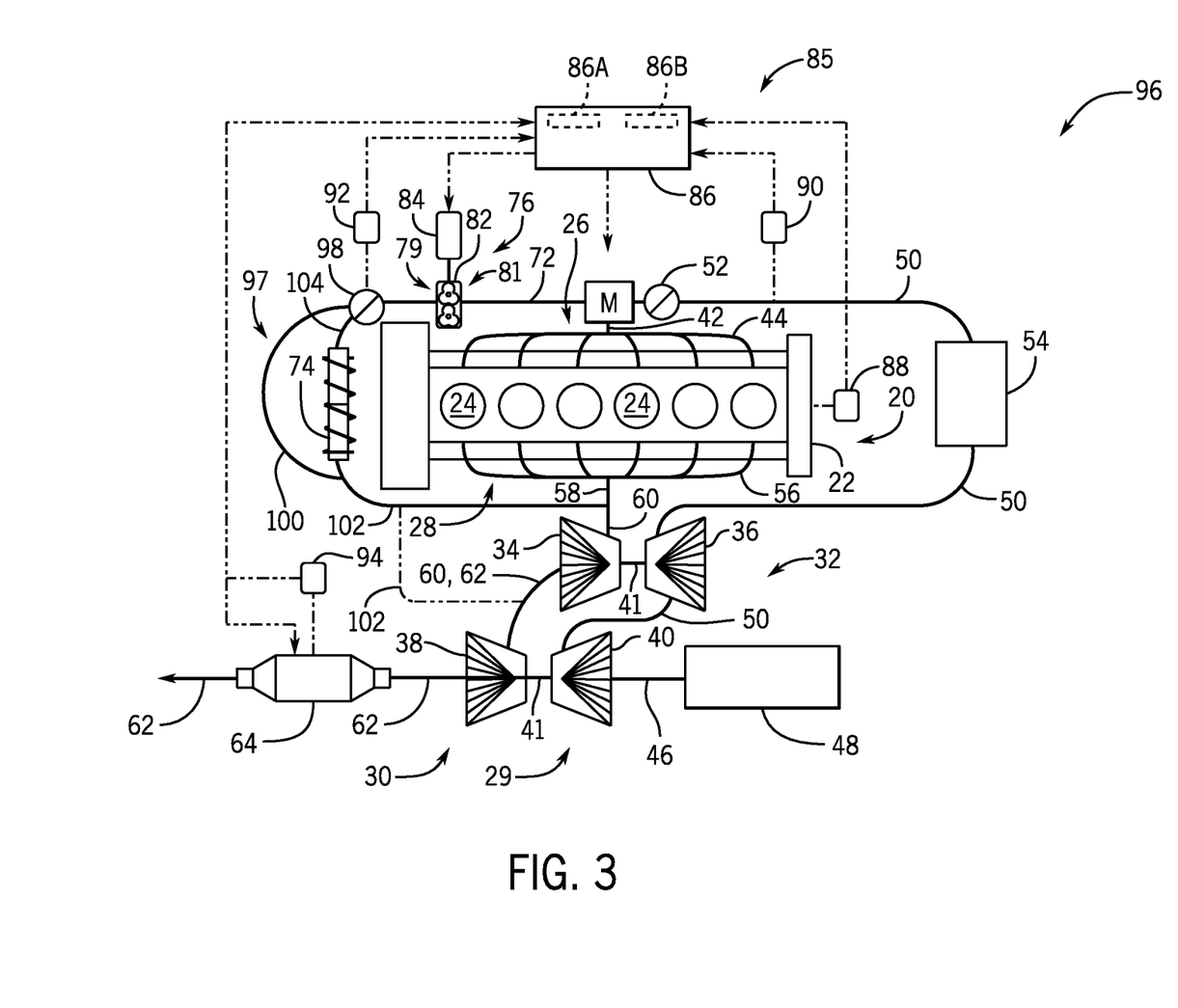
FIG. 3 is a schematic diagram of an example engine system having a reversible EGR pump in accordance with another example embodiment.

Referring now to FIG. 3, an engine system 96 is shown according to another embodiment. The engine system 96 includes many common components as the engine system 18 of FIG. 2, and thus common components of the system are identified consistent with those in FIG. 2. In the engine system 96, the engine 20 is provided with charge air from turbochargers 30, 32 to boost performance of the engine 20. Fresh air is drawn from the ambient environment through the fresh air intake passageway 46 and provided to the compressors 36, 40. The compressors 36, 40 compresses the fresh air and provide this "charge air" to the charge air passageway 50, with the charge air passed through the aftercooler 54 and throttle 52 before being supplied to the intake manifold 26 for feeding into the combustion cylinders 24 in the engine 20. Exhaust gas produced by the engine 20 during operation thereof is directed into the exhaust manifold 28 and is subsequently passed into the exhaust gas passageway 60. The exhaust gas is then directed to the turbochargers 30, 32 with the turbines 34, 38 receiving exhaust gas from the exhaust gas passageway 60 and spinning to drive rotation of the shaft 41 and, in turn, drive the compressors 36, 40. After passing through the turbines 34, 38 the exhaust gas is treated by the aftertreatment system 64 and vented to the ambient environment via the vent passageway 62. A portion of the exhaust gas produced by the engine 20 may also be recirculated from the exhaust gas passageway 60 into the intake manifold 26 via an EGR system 97, similar as to described above with regard to the EGR system 70 of FIG. 2.

In the embodiment of FIG. 3, a directional valve 98 and a bypass loop 100 are included in the EGR system 97 to control the flow of exhaust gas and fresh air therethrough, responsive to the current operational mode of the EGR pump 76. In the illustrated implementation, the directional valve 98 is disposed in-line with an EGR passageway 102 between the EGR cooler 74 and the EGR pump 76. More specifically, the directional valve 98 is positioned at a location where the EGR passageway 102 splits into a cooler passageway 104 (on which the EGR cooler 74 is positioned) and the bypass loop 100 that runs in parallel with the cooler passageway 104. The directional valve 98 may be electrically controlled in conjunction with the EGR pump 76 such that the directional valve 98 is moveable to a first position that fluidly connects the EGR passageway 102 and the EGR pump 76 with the cooler passageway 104 and a second position that fluidly connects the EGR passageway 102 and the EGR pump 76 with the bypass loop 100.

When the EGR pump 76 is operating in the forward mode, the directional valve 98 is actuated to the first position to provide a flow path through the EGR system 97 where a portion of the exhaust gas enters from the exhaust gas passageway 60 into the EGR passageway 102, proceeds along the cooler passageway 104 and through the EGR cooler 74, and then flows through the directional valve 98 and to the EGR pump 76, which functions to provide the exhaust gas to the intake manifold 26 and engine 20.

While the directional valve 98 is shown in FIG. 3 as being positioned above the EGR cooler 74 at a first end of the bypass loop 100, and between the EGR cooler 74 and the EGR pump 76, it is recognized that the directional valve 98 could instead be positioned below the EGR cooler 74 at a second end of the bypass loop 100. In this position, the directional valve 98 could be operated as previously described to control the flow of exhaust gas and fresh air through the EGR system 97.

When the EGR pump 76 is operating in the reverse mode, the directional valve 98 is actuated to the second position to provide a flow path through the EGR system 97 where any fresh air that is output from the EGR pump 76 is directed through the directional valve 98 and into the bypass loop 100 (bypassing the EGR cooler 74), before the fresh air then rejoins the main EGR passageway 102 and flows into the exhaust gas passageway 60.

As previously described with respect to the embodiment of FIG. 2, a controller 86 is included in the engine system 96 to control operation of the EGR pump 76 and overall operation of the engine system 96. The controller 86 may also control operation of the directional valve 98 and cause the directional valve to be selectively actuated to the first and second positions based on operation of the EGR pump in the forward mode or the reverse mode. As indicated above, when the engine system 96 is operating in the EGR mode, the controller 86 causes the EGR pump 76 to operate in the forward mode, with the controller 86 also causing the directional valve 98 to be actuated to the first position to provide a flow path through the EGR system 97 where a portion of the exhaust gas enters from the exhaust gas passageway 60 into the EGR passageway 102, through the EGR cooler 74, and proceeds along the cooler passageway 104, and then flows through the directional valve 98 to the intake manifold 26. The EGR pump 76 can be positioned upstream or downstream of the EGR cooler 74. When the engine system 96 is operating in the low speed-low load mode or in the ETM mode, the controller 86 causes the EGR pump 76 to operate in the reverse mode, with the controller 86 also causing the directional valve 98 to be actuated to the second position to provide a flow path through the EGR system 97 where any fresh air that is output from the EGR pump 76 is directed through the directional valve 98 and into the bypass loop 100 (bypassing the EGR cooler 74), before the fresh air then rejoins the main EGR passageway 102 and flows into the exhaust gas passageway 60.

Desirably, embodiments of the engine system described herein provide an efficient means by which to prevent an uncontrolled bypass flow of exhaust gas through the EGR pump of an EGR system. A reversible EGR pump is provided that can operate in a forward mode to recirculate exhaust gas from the exhaust manifold to the intake manifold and in a reverse mode to provide a zero flow through the EGR pump or generate a reverse flow of non-exhaust gas through the EGR pump. A controller selectively operates the EGR pump in the forward and reverse mode based on the operating conditions or operational mode of the engine system, including operating the EGR pump in the reverse mode when the engine system is operating in a low speed-low load mode or in an ETM mode, with the controller configured to switch operation of the EGR pump between the forward mode and the reverse mode during continued operation of the engine. By operating the EGR pump in the reverse mode, an uncontrolled bypass flow of exhaust gas through the EGR pump can be prevented that might otherwise be significant, especially when the pressure difference on opposing sides of the EGR pump is great, such as may occur during an ETM mode of operation. By preventing such bypass flow through the EGR pump, plugging and fouling of the EGR cooler and/or EGR pump that can occur from high levels of hydrocarbon and the overcooling of exhaust gas is prevented, along with the formation of condensate that can lead to corrosion of these devices.

Enumerated Examples

The following examples are provided, which are numbered for ease of reference.

1. An engine system includes an engine having one or more piston-cylinder arrangements communicating with an intake manifold and an exhaust manifold, a turbocharger including a turbine in communication with the exhaust manifold and a compressor driven by the turbine and in communication with the intake manifold, and an exhaust gas recirculation (EGR) system, with the EGR system further including an EGR pump having an inlet side in communication with the exhaust manifold and an outlet side in communication with the intake manifold and an EGR cooler that cools exhaust gas flowing through the EGR system. The engine system also includes a controller having a processor and memory architecture, with the controller operably connected with the EGR pump and configured to selectively operate the EGR pump in a forward mode to provide a flow of exhaust gas therethrough in a first direction and in a reverse mode to substantially prevent a flow of exhaust gas therethrough or to provide a non-exhaust air flow therethrough in a second direction.

2. The engine system of example 1, wherein operation of the EGR pump in the reverse mode to substantially prevent flow of exhaust gas therethrough or to provide the non-exhaust air flow therethrough in the second direction prevents a leakage of the exhaust gas through the EGR pump in the first direction.

3. The engine system of example 1, wherein the controller is configured to selectively operate the engine system in an exhaust thermal management (ETM) mode, and wherein the controller operates the EGR pump in the reverse mode when the engine system is in the ETM mode.

4. The engine system of example 3, wherein the controller is configured to monitor a condition of an aftertreatment system in the engine system that treats the exhaust gas prior to the exhaust gas being vented to atmosphere, compare the condition of the aftertreatment system to a condition threshold, and operate the engine system in the ETM mode when the condition of the aftertreatment system crosses the condition threshold, with operation in the ETM mode regenerating the aftertreatment system.

5. The engine system of claim 1, wherein the controller is configured to monitor one or more operational parameters in the engine system during operation, the one or more operational parameters including at least one of engine speed, pressure and temperature of fresh air provided to the intake manifold, or pressure and temperature of the exhaust gas at the inlet side of the EGR pump, and operate the engine system in either a low speed-low load mode or an EGR mode based on the one or more operational parameters.

6. The engine system of example 5, wherein when the engine system is operated in the low speed-low load mode, the controller operates the EGR pump in the reverse mode.

7. The engine system of example 5, wherein when the engine system is operated in the EGR mode, the controller operates the EGR pump in the forward mode.
8. The engine system of example 1, wherein the EGR system includes an EGR passageway that receives the exhaust gas from the exhaust manifold and delivers the exhaust gas to the EGR pump for providing to the intake manifold, the EGR passageway including a bypass loop around the EGR cooler, and wherein the EGR system further includes a directional valve operable to selectively allow or prohibit flow through the bypass loop.
9. The engine system of example 8, wherein the controller is configured to actuate the directional valve to a first position when the EGR pump is operating in the forward mode, such that the exhaust gas flows through the EGR cooler before flowing through the EGR pump in the first direction and actuate the directional valve to a second position when the EGR pump is operating in the reverse mode, such that any fresh air flowing through the EGR pump in the second direction bypasses the EGR cooler.
10. The engine system of example 8, wherein the directional valve is positioned on a first side of the EGR cooler, between the EGR cooler and the EGR pump, or is positioned on a second side of the EGR cooler opposite the first side.
11. The engine system of example 1, wherein the EGR pump is positioned upstream or downstream of the turbine.
12. The engine system of example 1, wherein the EGR pump is switched between the forward mode and the reverse mode during continued operation of the engine.
13. An engine system includes an engine having one or more piston-cylinder arrangements communicating with an intake manifold and an exhaust manifold, a turbocharger including a turbine in communication with the exhaust manifold and a compressor driven by the turbine and in communication with the intake manifold, and an exhaust gas recirculation (EGR) system, with the EGR system further including an EGR pump downstream of the exhaust manifold and upstream or downstream of the turbine, the EGR pump having an inlet side in communication with the exhaust manifold and an outlet side in communication with the intake manifold, and an EGR cooler that cools exhaust gas flowing through the EGR system. The engine system also includes a controller having a processor and memory architecture, with the controller operably connected with the EGR pump and configured to receive input signals on an operating condition of the engine system and selectively operate the EGR system based on the input signals, to control a recirculation of exhaust gas from the exhaust manifold to the intake manifold, wherein selectively operating the EGR system includes operating the EGR pump in a forward mode to flow exhaust gas therethrough in a first direction and in a reverse mode to substantially prevent flow of exhaust gas therethrough or to provide a non-exhaust air flow therethrough in a second direction.
14. The engine system of example 13, wherein the controller is configured to selectively operate the engine system in an exhaust thermal management (ETM) mode based on the input signals, with the controller operating the EGR pump in the reverse mode when the engine system is in the ETM mode, and wherein the input signals include a condition of an aftertreatment system in the engine system that treats the exhaust gas prior to the exhaust gas being vented to atmosphere, with the controller operating the engine system in the ETM mode when the condition of the aftertreatment system crosses a condition threshold.
15. The engine system of example 13, wherein the controller is configured to selectively operate the engine system in either a low speed-low load mode or an EGR mode based on the input signals, and wherein the controller operates the EGR pump in the reverse mode when the engine system is in the low speed-low load mode and operates the EGR pump in the forward mode when the engine system is in the EGR mode, with the input signals including one or more of engine speed, pressure and temperature of fresh air provided to the intake manifold, or pressure and temperature of the exhaust gas at the inlet side of the EGR pump.

CONCLUSION

The foregoing has thus provided an engine system configured such that an uncontrolled bypass flow of exhaust gas through the EGR pump of an EGR system is prevented. A reversible EGR pump is provided that can operate in a forward mode to recirculate exhaust gas from the exhaust manifold to the intake manifold and in a reverse mode to provide a zero flow through the EGR pump or generate a reverse flow of non-exhaust gas through the EGR pump. A controller selectively operates the EGR pump in the forward and reverse mode based on the operating conditions or operational mode of the engine system, including operating the EGR pump in the reverse mode when the engine system is operating in a low speed-low load mode or in an ETM mode. By operating the EGR pump in the reverse mode, an uncontrolled bypass flow of exhaust gas through the EGR pump can be prevented.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:
1. An engine system comprising:
an engine having one or more piston-cylinder arrangements communicating with an intake manifold and an exhaust manifold;
a turbocharger including a turbine in communication with the exhaust manifold and a compressor driven by the turbine and in communication with the intake manifold; and
an exhaust gas recirculation (EGR) system including:
an EGR pump having an inlet side in communication with the exhaust manifold and an outlet side in communication with the intake manifold; and
an EGR cooler that cools exhaust gas flowing through the EGR system; and
a controller, including a processor and memory architecture, operably connected with the EGR pump and configured to selectively operate the EGR pump in an EGR mode or in one of multiple non-EGR modes, including a first non-EGR mode and a second non-EGR mode, the controller operating the EGR pump in the EGR mode in a forward mode to provide a flow of exhaust gas to the intake manifold in a first direction and, in the first and second non-EGR modes, operating the EGR pump in a reverse mode, the controller controlling a speed at which the EGR pump is operated in the first non-EGR mode to prevent a flow of exhaust gas therethrough in the first direction and in a second direction opposite the first direction, and the controller operating the EGR pump in the second non-EGR mode to provide a non-exhaust air flow therethrough in the second direction;

wherein the controller receives inputs of a speed of the engine, a pressure or temperature of fresh air to the outlet side of the EGR pump, and a pressure or temperature of exhaust gas to the inlet side of the EGR pump, and, in the first non-EGR mode, uses the inputs to control the speed of the EGR pump to counteract pressure forces between the outlet side and the inlet side of the EGR pump.

2. The engine system of claim 1, wherein the second non-EGR mode is an exhaust thermal management (ETM) mode.

3. The engine system of claim 2, wherein the controller is configured to:
monitor a condition of an aftertreatment system in the engine system that treats the exhaust gas prior to the exhaust gas being vented to atmosphere;
compare the condition of the aftertreatment system to a condition threshold; and
operate the engine system in the ETM mode when the condition of the aftertreatment system crosses the condition threshold, with operation in the ETM mode regenerating the aftertreatment system.

4. The engine system of claim 1, wherein the controller is configured to determine whether to operate the engine system in either the first non-EGR mode or the EGR mode based on a comparison of one or more operational parameters with pre-determined threshold levels.

5. The engine system of claim 1, wherein the EGR system comprises an EGR passageway that receives the exhaust gas from the exhaust manifold and delivers the exhaust gas to the EGR pump for providing to the intake manifold, the EGR passageway further comprising a bypass loop around the EGR cooler, and wherein the EGR system further comprises a directional valve operable to selectively allow or prohibit flow through the bypass loop.

6. The engine system of claim 5, wherein the controller is configured to:
actuate the directional valve to a first position when the EGR pump is operating in the forward mode, such that the exhaust gas flows through the EGR cooler before flowing through the EGR pump in the first direction; and
actuate the directional valve to a second position when the EGR pump is operating in the reverse mode, such that any fresh air flowing through the EGR pump in the second direction bypasses the EGR cooler.

7. The engine system of claim 5, wherein the directional valve is positioned on a first side of the EGR cooler, between the EGR cooler and the EGR pump, or is positioned on a second side of the EGR cooler opposite the first side.

8. The engine system of claim 1, wherein the EGR pump is positioned upstream of the turbine.

9. The engine system of claim 1, wherein the EGR pump is positioned downstream of the turbine.

10. The engine system of claim 1, wherein the EGR pump is switched between the forward mode and the reverse mode during continued operation of the engine.

11. An engine system comprising:
an engine having one or more piston-cylinder arrangements communicating with an intake manifold and an exhaust manifold;
a turbocharger including a turbine in communication with the exhaust manifold and a compressor driven by the turbine and in communication with the intake manifold; and
an exhaust gas recirculation (EGR) system including:
an EGR pump downstream of the exhaust manifold and upstream or downstream of the turbine, the EGR pump having an inlet side in communication with the exhaust manifold and an outlet side in communication with the intake manifold; and
an EGR cooler that cools exhaust gas flowing through the EGR system; and
a controller, including a processor and memory architecture, operably connected with the EGR pump, the controller configured to:
receive input signals on an operating condition of the engine system, including input signals of a speed of the engine, a pressure or temperature of fresh air to the outlet side of the EGR pump, and a pressure or temperature of exhaust gas to the inlet side of the EGR pump; and
selectively operate the EGR system based on the input signals, to control a recirculation of exhaust gas from the exhaust manifold to the intake manifold;
wherein selectively operating the EGR system includes operating the EGR pump in an EGR mode or in one of multiple non-EGR-modes, including a first non-EGR mode and a second non-EGR mode, wherein, in the EGR mode, the EGR pump is operated in a forward mode to flow exhaust gas therethrough in a first direction and, in the first and second non-EGR modes, the EGR pump is operated in a reverse mode;
wherein, in the first non-EGR mode, the controller uses the input signals to operate the EGR pump at a speed to counteract pressure forces between the outlet side and the inlet side of the EGR pump and prevent flow of exhaust gas therethrough in the first direction and in a second direction opposite the first direction; and
wherein, in the second non-EGR mode, the EGR pump is operated to provide a non-exhaust air flow therethrough in the second direction.

12. The engine system of claim 11, wherein the second non-EGR mode is an exhaust thermal management (ETM) mode based on the input signals.

13. The engine system of claim 12, wherein the input signals comprise a condition of an aftertreatment system in the engine system that treats the exhaust gas prior to the exhaust gas being vented to atmosphere, and wherein the controller operates the engine system in the ETM mode when the condition of the aftertreatment system crosses a condition threshold.

14. The engine system of claim 11, wherein the controller is configured to selectively operate the engine system in either the first non-EGR mode or the EGR mode based on the input signals.

15. The engine system of claim 11, wherein the EGR system comprises an EGR passageway by which the exhaust gas is recirculated from the exhaust manifold back to the intake manifold, and wherein the EGR cooler and the EGR pump are positioned in-line with the EGR passageway, and wherein the EGR passageway includes a bypass loop around the EGR cooler.

16. The engine system of claim 15, wherein the EGR system further comprises a directional valve positioned on a first side of the EGR cooler, between the EGR cooler and the EGR pump, or positioned on a second side of the EGR cooler opposite the first side, the directional valve operable to selectively allow or prohibit flow through the bypass loop; and wherein the controller is operably connected to the directional valve to:
actuate the directional valve to a first position when the EGR pump is operating in the forward mode, such that the exhaust gas flows through the EGR cooler before flowing through the EGR pump in the first direction; and
actuate the directional valve to a second position when the EGR pump is operating in the reverse mode, such that any fresh air flowing through the EGR pump in the second direction bypasses the EGR cooler.

\* \* \* \* \*